UNITED STATES PATENT OFFICE.

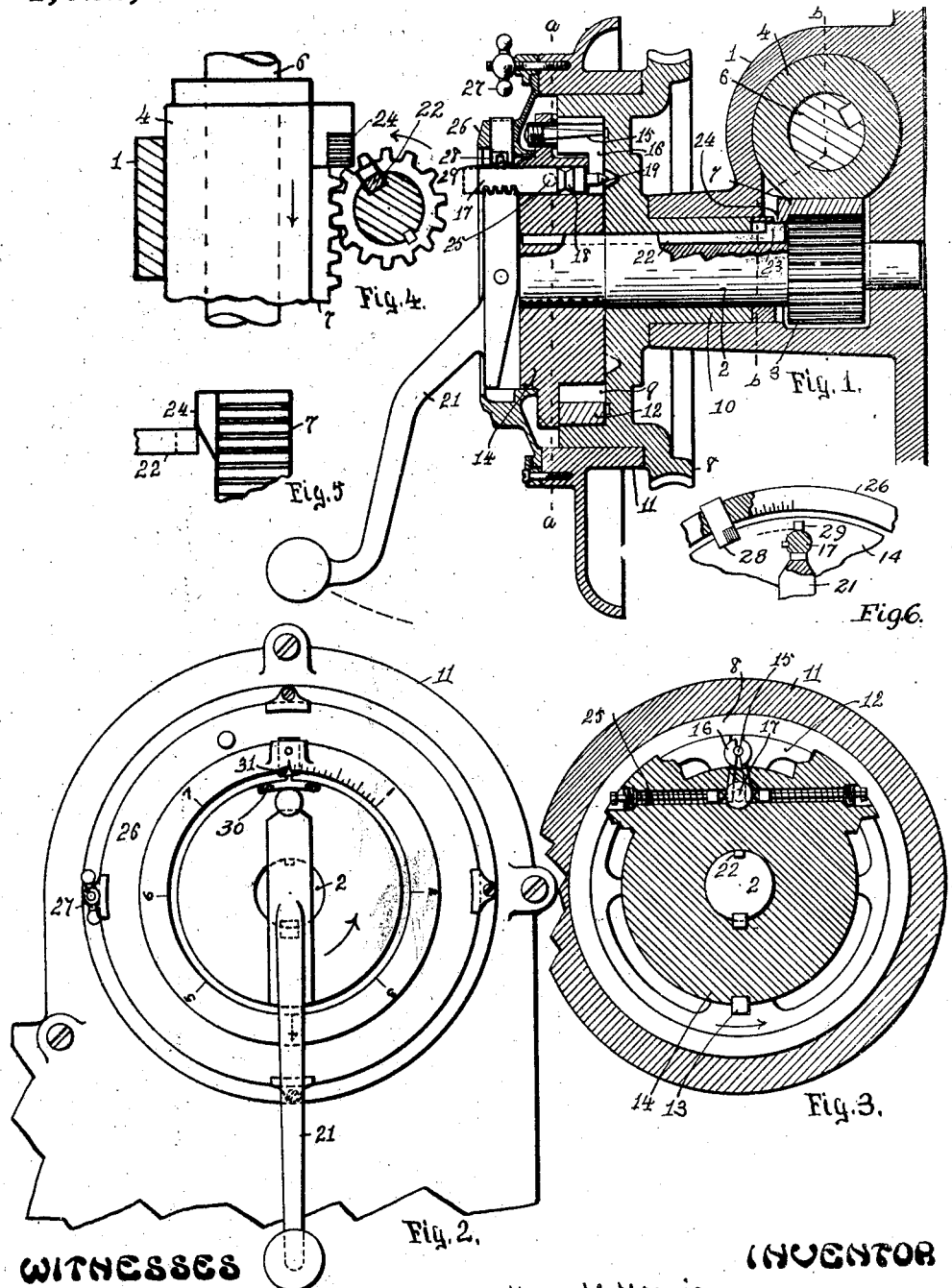
H. M. NORRIS.
AUTOMATIC SPINDLE STOP.
APPLICATION FILED OCT. 1, 1910.
1,022,866.
Patented Apr. 9, 1912.
WITNESSES
W. Thornton Bogert
Samuel Carr
INVENTOR
Henry M. Norris.
BY Robert S. Carr.
ATTORNEY

HENRY M. NORRIS, OF CINCINNATI, OHIO, ASSIGNOR TO THE CINCINNATI BICKFORD TOOL COMPANY, OF CINCINNATI, OHIO, A CORPORATION OF OHIO.

AUTOMATIC SPINDLE-STOP.

1,022,866.  Specification of Letters Patent.  Patented Apr. 9, 1912.

Application filed October 1, 1910. Serial No. 584,830.

*To all whom it may concern:*

Be it known that I, HENRY M. NORRIS, a citizen of the United States, residing at Cincinnati, Ohio, have invented a new and useful Improvement in Automatic Spindle-Stops, of which the following is a specification.

My invention relates to automatic spindle stops adapted to the use of radial drills or for other suitable purposes, and the objects of my improvements are to provide safety stop mechanism for automatically limiting the longitudinal movement of the spindle; to provide mechanism for limiting the longitudinal movement of the spindle to different predetermined points as indicated by an adjustable dial depth gage, and to provide simple and durable construction and assemblage of the different members for securing facility of operation and efficiency of action. These objects are attained in the following described manner as illustrated in the accompanying drawings, in which:—

Figure 1 is a horizontal section of an automatic spindle stop embodying my improvements; Fig. 2 a front elevation; Fig. 3 a vertical section on the line $a$—$a$ of Fig. 1; Fig. 4 a vertical section on the line $b$—$b$ of Fig. 1 with parts broken away; Fig. 5 a portion of the face of the sleeve rack, and Fig. 6 a front elevation with parts in section and parts broken away of the locking plunger and slanting lug with connecting members.

In the drawings, 1 represents a fixed bearing wherein a horizontal shaft 2 provided with a pinion 3 is journaled and also wherein the sleeve 4 for the spindle 6 is mounted to slide vertically, said sleeve is provided with a rack 7 in engagement with the pinion whereby the sleeve with the spindle may be actuated longitudinally within the bearing 1. A worm wheel 8 formed with a circular recess or counter-bore 9 in one end and journaled within fixed bearings 11 and 10 may be rotated by the engagement therewith of a driven worm shaft not shown. A contractile friction ring 12 emplaced within the counter bore 9 of the worm wheel 8 is secured by means of a key 13 to a member 14 which is keyed on shaft 2 to turn therewith. A taper pin 15 adjustably secured in said member serves as a fulcrum for the twin cam levers 16 which movably engage with the corresponding ends of the friction ring 12. A locking plunger 17 formed with an annular groove 18 having taper sides and with a taper point 19 is slidably mounted in an opening formed in member 14. A hand lever 21 fulcrumed on member 14 engages with and serves to move said plunger with its point between the twin levers 16 for separating them and thereby expanding the friction ring into frictional engagement with the worm wheel whereby the shaft and pinion are caused to move the rack with the sleeve and spindle in a downward direction.

A key 22 formed with a projecting head 23 and contacting at its point with the hand lever 21 is mounted to slide in a longitudinal groove formed in shaft 2. A slanting lug 24 projecting from one edge of the rack is arranged to intercept the head of key 22 at a predetermined point in the rotation of shaft 2 for moving said key with the hand lever in an outward direction whereby the plunger 17 is disengaged from the twin levers.

Spring actuated plungers 25 mounted in a transverse opening formed in member 14 are each formed with a taper point adapted to slidably engage with the annular groove 18 for yieldingly maintaining the plunger 17 completely disengaged from the twin levers. The contraction of the friction ring now disengages the worm wheel from the shaft 2 and serves as a safety stop to the downward movement of the spindle thereby. A graduated dial 26 secured in rotative adjustment on the bearing 11 by means of a hand clamp 27 is provided with a slanting lug 28. A pin 29 which projects from plunger 17 is adapted to slidably engage with the slanting lug 28 and thereby automatically move the plunger out of engagement with the twin levers for discontinuing the downward movement of the spindle and forming a depth gage to the hole being drilled corresponding to the position on the dial of the pointer 31 which is rotatively movable with the hand lever. Said pointer may be secured in different lateral adjusted positions in relation to the hand lever as shown at 30 in Fig. 2 for obtaining accuracy of indication.

In operation, the movement of the key 22 by means of the slanting lug 24 at a predetermined point in the downward movement of the rack 7 serves as an automatic safety stop for the spindle when it has reached its lowest point. The rotative adjustment of the dial with the slanting lug 28 to different points as indicated on the graduations by the pointer, causes the pin 29 to intercept said lug and move the plunger for discontinuing the movement of the spindle in a predetermined intermediate point of its descent corresponding in amount with the indicated graduation on the dial, thereby forming an automatic depth stop.

The spindle may also be stopped at any point in its longitudinal movement by means of the hand lever 21 and its connections for releasing the friction ring from engagement with the worm wheel. Said lever also serves to turn the pinion for raising the spindle when desired.

Having fully described my improvements, what I claim as my invention and desire to secure by Letters Patent of the United States is:—

1. The combination of a rotatively driven member, a shaft provided with a pinion, a clutch for engaging the shaft with said member, a spindle sleeve provided with a rack engaging with the pinion and means carried by the shaft and actuated by the rack for disengaging the clutch.

2. A spindle stop comprising a rotatively driven member, a rack and pinion, hand actuated connections including a clutch engaging the member therewith, and a movable key carried by the pinion into engagement with the rack for disengaging the clutch.

3. In a spindle stop the combination with a rotatively driven member, of a rack and pinion, connections including a clutch for detachably engaging the pinion to turn with said member, and a movable key actuated by its engagement with the rack for disengaging said connections.

4. A spindle stop comprising a rotatively driven member, a rack and pinion, connections between the pinion and the driven member including a clutch, a graduated dial rotatively adjustable in relation to the pinion and provided with a stop, and means rotated with the pinion into engagement with the stop for disengaging the clutch.

5. A spindle stop comprising a shaft provided with a pinion, a graduated dial depth gage concentric therewith, means for securing said gage in different rotative positions, a rotatively driven member concentric with the shaft, connections between the shaft and the member including a clutch, a spindle sleeve provided with a rack engaging with the pinion, a pointer movable with the shaft to different graduations on the gage, and automatic mechanism constructed and arranged to disengage the clutch simultaneously with the registration of the pointer with a predetermined point on the gage.

6. The combination of a spindle sleeve provided with a rack, a shaft provided with a pinion in engagement with the rack, a rotatively driven member mounted to turn thereon, clutch connections between said member and shaft, a hand-lever carried by the shaft for actuating said connections, and means actuated by the rack for actuating the lever to disengage the clutch at a terminal point in the movement of the rack.

H. M. NORRIS.

Witnesses:
W. T. BLAIR,
MATT. J. DAY.